Patented Dec. 12, 1944

2,365,035

UNITED STATES PATENT OFFICE 2,365,035

METHOD FOR ACCELERATING THE POLYMERIZATION OF HALOPRENES

Mortimer A. Youker, Gordon Heights, Del., assignor to E. I. du Pont de Nemours & Company, Wilmington, Del., a corporation of Delaware No Drawing. Application January 26, 1939, Serial No. 252,914

7 Claims. (Cl. 260—92.7)

This invention relates to the polymerization of chloro-2-butadiene-1,3, hereinafter, for convenience, called "chloroprene." More particularly it relates to improved methods for accelerating the polymerization of chloroprene while it is in a dispersed state.

Many methods have been disclosed in issued patents and pending applications for the polymerization of chloroprene, including methods by which acceleration of polymerization is secured by the use of heat, light, pressure, and catalysts (such as peroxides) and by the emulsification of the chloroprene. Some of these methods of acceleration, however, are not applicable to all types of polymerization and particularly not to emulsion polymerization in the presence of modifying agents such as those disclosed in certain copending applications hereinafter identified. Furthermore, many of these methods of acceleration appreciably increase the cost of manufacturing polymers by requiring the use of more elaborate apparatus or costly chemicals.

It is an object of this invention to provide a new method for accelerating the polymerization of chloroprene. A further object is to provide a new method for accelerating the polymerization of chloroprene, which is cheap to operate and which may be used in conjunction with previously known methods to secure a still greater increase in the rate of polymerization. A still further object is to provide a method for accelerating the polymerization of chloroprene while the chloroprene is dispersed in an aqueous medium and particularly when modifying agents are also present during the polymerization. Other objects will appear hereinafter.

It has now been found that these objects may be accomplished by polymerizing chloroprene while it is dispersed in an aqueous medium having a pH of less than about 7 in the presence of heterocyclic compounds, particularly those containing the group:

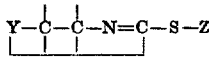

in which Y is an atom of an element belonging to the sixth group of the periodic system, preferably sulfur, and Z is a radical chosen from Group Z in the following Table I and is preferably hydrogen:

TABLE I

Group Z

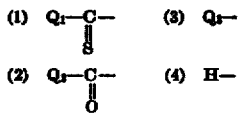

In this table C, S, and H have their usual significance and $Q_1$, $Q_2$, and $Q_3$ are monovalent radicals of the group consisting of (a) aliphatic hydrocarbon radicals, (b) aromatic hydrocarbon radicals, (c) hydroaromatic hydrocarbon radicals, (d) heterocyclic radicals with oxygen and carbon forming the ring, (e) heterocyclic radicals with sulfur and carbon forming the ring, and (f) radicals similar to those described in a, b, c, d, and e but differing only in that one or more of the hydrogen atoms is replaced by a radical of the group consisting of halogen, nitro, acetyl, sulfo, alkoxyl, and carboxyl. In the compounds, the bonds on the carbon atoms, which are shown free in the group

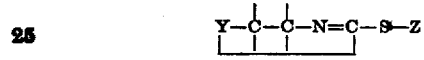

are satisfied by carbon or hydrogen and preferably these two adjacent carbon atoms in the heterocyclic ring also form part of the ring of an aromatic hydrocarbon. A particularly preferred accelerator is mercapto-benzo-thiazole.

The varied embodiments of this invention are illustrated in the following examples. It should be understood, however, that these examples are intended to be illustrative only and not intended to limit the scope of the invention. The term "parts," whenever hereinafter used, signifies "parts by weight."

EXAMPLE 1

100 parts of chloroprene and 1 part of mercapto-benzo-thiazole were emulsified in 1700 parts of a 0.25% aqueous solution of the sodium salts of iso-propyl-naphthalene-sulfonic-acids and placed in a thermally insulated vessel. During 110 minutes the temperature rose 8.2°, corresponding to 82% polymerization. Under exactly similar conditions but without the added mercapto-benzo-thiazole, the temperature rise was only 2.6°, corresponding to 26% polymerization.

The resulting latex was somewhat similar to those prepared according to U. S. P. 1,967,861.

Mercapto-benzo-thiazole and similar compounds have been found to accelerate the slow polymerization which takes place in the presence of certain inhibitors of polymerization as illustrated in the following example.

EXAMPLE 2

100 parts of chloroprene and 100 parts of toluene emulsified in 800 parts of a 0.25% solution of the emulsifying agent used in Example 1 was allowed to polymerize for three hours at room temperature, then treated with 1 part of mercapto-benzo-thiazole and 1 part of phenyl-beta-naphthylamine dispersed in an additional quantity of the emulsifying solution. After standing for sixteen hours more at room temperature, the product was coagulated by the addition of sodium chloride, washed with alcohol, and dried by milling on a rubber mill at 50° C. The milling was then continued until the polymer was sufficiently plastic to form a continuous and fairly smooth sheet. Seventy-one parts of polymer were thus obtained. In a similar experiment in which no mercapto-benzo-thiazole was added, the yield was only 44 parts. The polymer made in the presence of mercapto-benzo-thiazole, when compounded with ten parts of magnesium oxide, five parts of zinc oxide and 5 parts of rosin per 100 parts of polymer and heated for 120 minutes at 131° C. had a tensile strength of 3650 lbs. per square inch.

EXAMPLE 3

100 parts of chloroprene with ½ part of mercapto-benzo-thiazole in solution were dispersed in 400 parts of water containing 4 parts of sulfur dioxide and 4 parts of the sodium salt of sulfonated abietene. After polymerization for 3.5 hours at 20° C., the product was coagulated with sodium chloride and dried by milling on a rubber mill. 93 parts of dry polymer were thus obtained, whereas in an experiment exactly similar, except that no mercapto-benzo-thiazole was present, the yield was only 71%. The product made with mercapto-benzo-thiazole was similar to those obtained as described in a copending application of Starkweather, Serial No. 69,739, filed March 19, 1936 (in which polymerization of chloroprene in the presence of inorganic modifying agents, such as sulfur dioxide, is described) that is, it was plastic and capable of being converted by heat (particularly after compounding as described for instance in Example 2 above) to a strong and highly elastic product closely resembling vulcanized natural rubber.

Similarly, mercapto-benzo-thiazole has been used to accelerate emulsion polymerization in the presence of organic modifying agents whose use is described in a copending application of Starkweather and Collins, Serial No. 156,518, filed July 30, 1937 now U. S. Patent 2,227,517, which discloses emulsion polymerization of chloroprene in the presence of organic modifying agents. The organic modifying agents which this latter case discloses are unpolymerizable acid-stable organic compounds which are capable of forming an addition product with compounds of the general formula

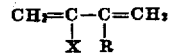

in which X is hydrogen and R is a member of the group consisting of hydrogen and hydrocarbon radicals under conditions of polymerization of such compounds of said general formula. This group of modifying agents includes the following classes of organic chemical compounds:

(1) Unsaturated compounds containing one or more carbonyl groups adjacent to the double bond;
(2) Aromatic sulfinic acids;
(3) Aromatic mercaptans;
(4) Mercapto-carboxylic acids;
(5) Aliphatic mercaptans.

EXAMPLE 4

The use of ½ part of mercapto-benzo-thiazole (dissolved in the chloroprene before emulsification) in a procedure in which 100 parts of chloroprene and 2 parts of chloroprene and 2 parts of thiophenol were emulsified in 300 parts of water containing 3 parts of the sodium salt of sulfated oleyl acetate and polymerized at 40° C., increased the amount of polymer formed in 1.5 hours from 62% to 78%.

The accelerating effect of mercapto-benzo-thiazole on emulsion polymerization in the presence of hydrogen sulfide (the use of which is described in a copending application of Starkweather and Collins, Serial No. 69,737, filed March 19, 1936, now U. S. Patent 2,163,250) is illustrated in the following example.

EXAMPLE 5

100 parts of chloroprene were emulsified in 300 parts of water containing 3 parts of the sodium salt of sulfated oleyl acetate. To this emulsion were added with stirring 0.8 part of a 33% aqueous solution of sodium sulfhydrate, 2.8 parts of a solution of the sodium salt of mercapto-benzo-thiazole (made by dissolving 20 parts of the thiazole and 6 parts of sodium hydroxide in 85 parts of water), and 1.33 parts of concentrated hydrochloric acid. This mixture furnished 0.19 part of hydrogen sulfide and 0.5 part of mercapto-benzo-thiazole and made the emulsion acid to Congo red. The emulsion was allowed to warm spontaneously to 40°. After 80 minutes at this temperature, a yield of 89% was obtained. By following the same procedure, except that no sodium salt of the thiazole was added and only 0.95 part of hydrochloric acid, (giving the emulsion approximately the same initial hydrogen ion concentration as the first) were used, 120 minutes were required for an 86% yield.

The product made with mercapto-benzo-thiazole was similar to those obtained according to the examples of the copending application of Starkweather and Collins, last mentioned above. When the latex was treated with 1 part each of tetra-methyl-thiuram-disulfide and phenyl-beta-naphthylamine (dispersed in a portion of the emulsifying solution), coagulated with salt, washed with water and dried by milling as is also described in this copending application of Starkweather and Collins and finally compounded and cured as in Example 2 above, a tensile strength of 3925 lbs. per square inch was obtained.

As mentioned above, a great variety of heterocyclic compounds may be used to accelerate the emulsion polymerization of chloroprene. Some of them, indeed, have an even greater effect than mercapto-benzo-thiazole itself. The following Table II gives the effects of several typical compounds of this class, when used in place of mercapto-benzo-thiazole in the process of Example 5, the quantity of hydrochloric acid being adjusted in each case to give approximately the same hydrogen ion concentration. Polymerization with mercapto-benzo-thiazole and without any accelerator are included for comparison:

substituted compounds cited above, some of the chloroprene polymerization accelerators may even be accelerators of the spontaneous conver-

TABLE II

| Accelerator | Formula | Approx. time for 85% yield at 40° C. |
|---|---|---|
| | | Minutes |
| Mercapto-2-thiazoline | (thiazoline with C—SH) | 75 |
| Mercapto-2-methyl-4-benzo-thiazole | (CH₃-benzothiazole with C—SH) | 80 |
| Mercapto-2-amino-5-benzo-thiazole | (NH₂-benzothiazole with C—SH) | 85 |
| Dimercapto-2:6-benzo-bis-thiazole (probable structure—made from meta phenylene diamine and CS₂). | HS—C...C—SH (bis-thiazole) | 80 |
| Mercapto-2-benzo-thiazole furoate | (benzothiazole with C—S—CO—C₄H₃O) | 80 |
| Benzo-thiazyl-thioglycollic acid | (benzothiazole with C—S—CH₂COOH) | 40 |
| Mercapto-2-naphtho-thiazole (probable structure—made from beta naphthylamine and CS₂). | (naphthothiazole with C—SH) | 45 |
| Mercapto-2-benzo-oxazole | (benzoxazole with C—SH) | 75 |
| Do | (benzothiazole with C—SH) | 80 |
| None | | 120 |

It will be seen that thiazole and oxazole derivatives of varied types function as accelerators of polymerization and that the class of compounds which so function is much broader than that class in which the compounds function as stabilizers for the storage of chloroprene polymers as disclosed in a copending application of Walker, Serial No. 154,212, filed July 17, 1937. Thus, presence in the molecule of an amino group or a second mercapto group destroys the stabilizing action but not, as illustrated in the table, the accelerating effect upon chloroprene polymerization. In fact, as illustrated by the same sion of plastic chloroprene polymer to the elastic, non-plastic form, and may even show this effect in the presence of added stabilizers. Accordingly, it is preferable, when making plastic polymer for which good stability is desired, to use as accelerators only those thiazole derivatives which are also stabilizers for the polymers. On the other hand, when storage stability is not an object, members of the broader class of heterocyclic accelerators defined above may be used to advantage. It will be noted that, under this definition and as illustrated in part in the table, mercapto derivatives of oxazoles, thiazoles, selenazoles, etc., or of the corresponding oxazolines, etc., with or without attached benzenoid rings may be used, that a wide variety of ring-substitution in these compounds is possible, and that the hydrogen of the mercapto group may be substituted by groups, such as acyl and thioacyl radicals and hydrocarbon radicals, either substituted or unsubstituted, without destroying the accelerating effect. The accelerating effect is, indeed, not limited even to this broad class, but has also been observed with other heterocyclic compounds, such as thiophthalid, thioindoxyl and thioindigo.

The accelerator may be added to either the chloroprene or the emulsifying solution or to both before emulsification or to the emulsion after its formation. As in Example 2, it is sometimes desirable to add the accelerator after the polymerization has proceeded somewhat. The material may conveniently be added to the emulsion in the form of a dispersion in a portion of the emulsifying solution. As in Example 5, the mercapto-benzo-thiazole or other acidic accelerator may be added in the form of an aqueous solution of one of its water-soluble salts, from which it is generated by the action of acid. An amount of accelerator equal to about 0.5% to about 1.0% by weight of the chloroprene is usually sufficient to give the desired effect. Larger and smaller amounts are of course included within the scope of this invention.

Acceleration of polymerization is obtained by means of mercapto-benzo-thiazole and related compounds defined above in emulsion of any pH below about 7. In alkaline emulsions a retarding action is usually observed. Any emulsifying agent may be used which is stable under the conditions of the polymerization but the emulsifying agent is preferably one containing combined sulfuric acid as the salt-forming group, such as the soluble salts of a sulfonated alkyl-naphthalene or unsaturated hydrocarbon of high molecular weight (such as abietene) or of a sulfated higher (C₁₂ to C₁₈ preferred) alcohol, sulfated unsaturated ester, or the like. The quantity of emulsifying agent employed should be sufficient to maintain the dispersion. In general from about 0.2% to about 6% of emulsifying agent based on the weight of the emulsifying medium will be found satisfactory but both greater and less amounts may be used.

The emulsion of the chloroprene may be prepared in any desired manner and although the accelerators are effective with widely varying concentrations of chloroprene in the dispersion, it is preferable in general to avoid very high or very low concentrations. Polymerization may be conducted at temperatures ranging from about 0° C. to about 100° C. but preferred temperatures lie between about 20° C. and about 60° C. Antioxidants such as phenyl beta naphthylamine, are preferably incorporated into the polymer after its formation.

In general, it has been found that the accelerators of this invention are applicable to all polymerizations of compounds of the general formula

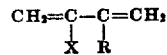

in which R is hydrogen or hydrocarbon and X is a halogen atom, in aqueous emulsion having a pH of about 7 or less. Thus, the invention includes within its scope the use of accelerators of the class disclosed under all the wide variety of conditions disclosed in U. S. Patent No. 1,967,861 but with a pH of 7 or less rather than above as is specifically disclosed in this patent.

The preferred form of the invention involves polymerization of chloroprene. The invention is particularly applicable to the wide variety of polymerizations in aqueous emulsions having a pH of about 7 or less described in the copending applications of Starkweather, Serial No. 69,739, filed March 19, 1936, and Starkweather and Collins, Serial Nos. 69,737 and 156,518, filed March 19, 1936, and July 30, 1937, respectively. Thus, the process includes all modifications as to temperature, concentration, nature of material polymerized, etc., disclosed in the patent and applications above identified so long as the pH of the dispersion is about 7 or less. Preferred accelerators are defined above and it will be noted that these particular compounds in addition to acting as accelerators of polymerization are also capable of functioning as stabilizers for the heat curable plastic polymers as disclosed in a copending application of Walker, Serial No. 154,212, filed July 17, 1937.

The use of the accelerators does not in general decrease the quality of the polymers in any way, (except in that as already noted the presence of certain substituent groups may decrease the stability of the plastic polymer), and may, in many cases improve the product particularly as regards stability, plasticity and tensile strength. The products of this invention may therefore be used for all the purposes and in all the various ways in which the products of the inventions described in the above identified Collins patent and in the above identified Starkweather application and Starkweather and Collins applications may be used as disclosed in that patent and in those applications. In short, the present invention constitutes a method of accelerating polymerization which has so little effect on the properties of the product that after the polymers are formed they may be further processed and used as they might otherwise have been used had they not been formed in the presence of an accelerator as described herein.

It is apparent that many widely different embodiments of this invention may be made without departing from the spirit and scope thereof and therefore it is not intended to be limited as indicated in the appended claims.

I claim:

1. The process which comprises polymerizing, in emulsion, a compound of the general formula

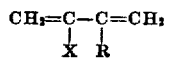

in which X is halogen and R is a member of the group consisting of hydrogen and hydrocarbon radicals in the presence of an accelerator which is a compound containing the group

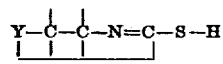

in which Y is a member of the group consisting of oxygen, sulfur, and selenium, the bonds on the carbon atoms which are shown free in the group being satisfied in the compounds by a member of the group consisting of carbon and hydrogen, said process being further characterized in that the hydrogen ion concentration of the emulsion of the compound of the general formula is on the acid side of pH 7 during the entire period of polymerization.

2. The process of claim 1 further characterized in that the compound of the general formula is chloro-2-butadiene-1,3.

3. The process of claim 1 further characterized in that the accelerator is a compound in which Y is sulfur and in which the two adjacent carbon atoms in the heterocyclic ring also form part of the ring of an aromatic hydrocarbon.

4. The process of claim 1 further characterized in that the compound of the general formula is chloro-2-butadiene-1,3 and in that the accelerator is a compound in which Y is sulfur and in which the two adjacent carbon atoms in the heterocyclic ring also form part of a ring of an aromatic hydrocarbon.

5. The process of claim 1 further characterized in that the amount of accelerator employed is from about 0.5 per cent to 1.0 per cent by weight, based on the compound of the general formula.

6. The process which comprises polymerizing chloro-2-butadiene-1,3 in aqueous emulsion and in the presence of mercapto-benzo-thiazole, said process being further characterized in that the hydrogen ion concentration of the emulsion of chloro-2-butadiene-1,3 is on the acid side of pH 7 during the entire period of polymerization.

7. The process which comprises polymerizing chloro-2-butadiene-1,3 in aqueous emulsion and in the presence of from about 0.5 per cent to about 1.0 per cent, by weight, based on the chloro-2-butadiene-1,3, of mercapto-benzo-thiazole, said process being further characterized in that the hydrogen ion concentration of the emulsion of chloro-2-butadiene-1,3 is on the acid side of pH 7 during the entire period of polymerization.

MORTIMER A. YOUKER.

---

CERTIFICATE OF CORRECTION.

Patent No. 2,365,035. December 12, 1944.

MORTIMER A. YOUKER.

It is hereby certified that error appears in the printed specification of the above numbered patent requiring correction as follows: Page 3, line 80, Table II, strike out "Do" and insert instead --Mercapto-2-benzo-thiazole--; and that the said Letters Patent should be read with this correction therein that the same may conform to the record of the case in the Patent Office.

Signed and sealed this 2nd day of October, A. D. 1945.

Leslie Frazer (Seal) First Assistant Commissioner of Patents.

2. The process of claim 1 further characterized in that the compound of the general formula is chloro-2-butadiene-1,3.

3. The process of claim 1 further characterized in that the accelerator is a compound in which Y is sulfur and in which the two adjacent carbon atoms in the heterocyclic ring also form part of the ring of an aromatic hydrocarbon.

4. The process of claim 1 further characterized in that the compound of the general formula is chloro-2-butadiene-1,3 and in that the accelerator is a compound in which Y is sulfur and in which the two adjacent carbon atoms in the heterocyclic ring also form part of a ring of an aromatic hydrocarbon.

5. The process of claim 1 further characterized in that the amount of accelerator employed is from about 0.5 per cent to 1.0 per cent by weight, based on the compound of the general formula.

6. The process which comprises polymerizing chloro-2-butadiene-1,3 in aqueous emulsion and in the presence of mercapto-benzo-thiazole, said process being further characterized in that the hydrogen ion concentration of the emulsion of chloro-2-butadiene-1,3 is on the acid side of pH 7 during the entire period of polymerization.

7. The process which comprises polymerizing chloro-2-butadiene-1,3 in aqueous emulsion and in the presence of from about 0.5 per cent to about 1.0 per cent, by weight, based on the chloro-2-butadiene-1,3, of mercapto-benzo-thiazole, said process being further characterized in that the hydrogen ion concentration of the emulsion of chloro-2-butadiene-1,3 is on the acid side of pH 7 during the entire period of polymerization.

MORTIMER A. YOUKER.

CERTIFICATE OF CORRECTION.

Patent No. 2,365,035.  December 12, 1944.

MORTIMER A. YOUKER.

It is hereby certified that error appears in the printed specification of the above numbered patent requiring correction as follows: Page 3, line 80, Table II, strike out "Do" and insert instead --Mercapto-2-benzo-thiazole--; and that the said Letters Patent should be read with this correction therein that the same may conform to the record of the case in the Patent Office.

Signed and sealed this 2nd day of October, A. D. 1945.

Leslie Frazer (Seal) First Assistant Commissioner of Patents.